United States Patent
Gao

(10) Patent No.: US 10,194,397 B2
(45) Date of Patent: Jan. 29, 2019

(54) POWER SUPPLY CONTROL METHOD AND WIRELESS TERMINAL

(71) Applicant: Huawei Device Co., Ltd., Dongguan (CN)

(72) Inventor: Chunyu Gao, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

(21) Appl. No.: 15/032,025

(22) PCT Filed: Oct. 15, 2014

(86) PCT No.: PCT/CN2014/088678
§ 371 (c)(1),
(2) Date: Apr. 25, 2016

(87) PCT Pub. No.: WO2015/062415
PCT Pub. Date: May 7, 2015

(65) Prior Publication Data
US 2016/0309416 A1     Oct. 20, 2016

(30) Foreign Application Priority Data

Oct. 30, 2013 (CN) .......................... 2013 1 0529506

(51) Int. Cl.
*H04B 7/00* (2006.01)
*H04W 52/02* (2009.01)
(Continued)

(52) U.S. Cl.
CPC ... *H04W 52/0258* (2013.01); *H04W 52/0216* (2013.01); *H04W 52/0274* (2013.01);
(Continued)

(58) Field of Classification Search
CPC ......... H04W 52/0209; H04W 52/0212; H04W 52/0219
(Continued)

(56) References Cited

U.S. PATENT DOCUMENTS 5,999,830 A * 12/1999 Taniguchi ......... H04W 52/0283
455/462
7,496,060 B2 * 2/2009 Ramirez ............... H04W 88/06
370/311
(Continued)

FOREIGN PATENT DOCUMENTS

CN     101404535 A     4/2009
CN     101663889 A     3/2010
(Continued)

OTHER PUBLICATIONS

Partial English Translation and Abstract of Chinese Patent Application No. CN101404535, Apr. 19, 2016, 5 pages.
(Continued)

*Primary Examiner* — Dmitry Levitan
(74) *Attorney, Agent, or Firm* — Conley Rose, P.C.

(57) ABSTRACT

A power supply control method and a wireless terminal. The method includes, in a part or all of a time period during which a wireless terminal is in a dormant state, stopping supplying power to some or all circuits of a radio frequency circuit in the wireless terminal, where the dormant state includes at least one of a dormant state in a discontinuous transmission (DTX) period and a dormant state in a discontinuous reception (DRX) period and the problems of electric energy waste and service life reduction of a wireless terminal are resolved.

18 Claims, 6 Drawing Sheets

(51) Int. Cl.
*H04W 72/04* (2009.01)
*H04W 76/27* (2018.01)
*H04W 76/28* (2018.01)

(52) U.S. Cl.
CPC ......... *H04W 72/042* (2013.01); *H04W 76/27* (2018.02); *H04W 76/28* (2018.02); *Y02D 70/00* (2018.01); *Y02D 70/1222* (2018.01); *Y02D 70/1244* (2018.01); *Y02D 70/1262* (2018.01); *Y02D 70/142* (2018.01); *Y02D 70/144* (2018.01); *Y02D 70/24* (2018.01); *Y02D 70/25* (2018.01); *Y02D 70/26* (2018.01)

(58) Field of Classification Search
USPC .................. 370/310, 311, 328, 329, 349
See application file for complete search history.

(56) References Cited

U.S. PATENT DOCUMENTS

| | | | |
|---|---|---|---|
| 8,169,957 B2* | 5/2012 | Damnjanovic ... | H04W 52/0216 370/318 |
| 8,238,260 B2* | 8/2012 | Terry ................ | H04W 52/0212 370/252 |
| 8,289,891 B2* | 10/2012 | Ji ...................... | H04W 52/0232 370/311 |
| 8,423,036 B2* | 4/2013 | Ahluwalia ........... | H04W 76/28 455/450 |
| 9,014,070 B2* | 4/2015 | Guey ................ | H04W 52/0206 370/311 |
| 9,282,519 B2* | 3/2016 | Park .................. | H04W 52/0274 |
| 9,332,584 B2* | 5/2016 | Verger .............. | H04W 52/0216 |
| 2008/0113692 A1 | 5/2008 | Zhao et al. | |
| 2008/0235748 A1 | 9/2008 | Park | |
| 2009/0186614 A1* | 7/2009 | Aoyama ............... | H04W 76/28 455/436 |
| 2009/0295230 A1 | 12/2009 | Rousu et al. | |
| 2010/0118815 A1* | 5/2010 | Kim .................. | H04W 52/0216 370/329 |
| 2013/0094414 A1 | 4/2013 | Park et al. | |

FOREIGN PATENT DOCUMENTS

| | | |
|---|---|---|
| EP | 0939495 A1 | 9/1999 |
| JP | 2001345732 A | 12/2001 |
| KR | 20050060533 A | 6/2005 |

OTHER PUBLICATIONS

Partial English Translation and Abstract of Chinese Patent Application No. CN101663889, Apr. 19, 2016, 6 pages.
Foreign Communication From a Counterpart Application, European Application No. 14857166.4, Extended European Search Report dated Aug. 29, 2016, 8 pages.
Foreign Communication From a Counterpart Application, PCT Application No. PCT/CN2014/088678, English Translation of International Search Report dated Jan. 21, 2015, 2 pages.
Foreign Communication From a Counterpart Application, PCT Application No. PCT/CN2014/088678, English Translation of Written Opinion dated Jan. 21, 2015, 2 pages.
Machine Translation and Abstract of Japanese Publication No. JP2001345732, Dec. 14, 2001, 23 pages.
Foreign Communication From a Counterpart Application, Japanese Application No. 2016-527388, Japanese Office Action dated Feb. 27, 2018, 3 pages.
Foreign Communication From a Counterpart Application, Japanese Application No. 2016-527388, English Translation of Japanese Office Action dated Feb. 27, 2018, 3 pages.

* cited by examiner

POWER SUPPLY CONTROL METHOD AND WIRELESS TERMINAL

CROSS-REFERENCE TO RELATED APPLICATIONS

This application is a U.S. National Stage of International Application No. PCT/CN2014/088678, filed on Oct. 15, 2014, which claims priority to Chinese Patent Application No. 201310529506.7, filed on Oct. 30, 2013, both of which are hereby incorporated by reference in their entireties.

TECHNICAL FIELD

The present disclosure relates to the field of communications applications, and in particular, to a power supply method of a wireless terminal and a wireless terminal.

BACKGROUND

When a wireless terminal communicates with a network side device, the wireless terminal may switch between an idle state and a connected state. To reduce electric energy consumption of the wireless terminal, when the wireless terminal is in the idle state, the wireless terminal usually listens on a paging channel in a manner of discontinuous reception (DRX), and sends data to the network side device in a manner of discontinuous transmission (DTX).

FIG. 1 is a diagram of a DRX state of the wireless terminal. In a DRX period, the wireless terminal has two states, a dormant state and an awake state. The wireless terminal receives, only in the awake state, a message (such as a paging message) sent by a network side device. When the wireless terminal is in the dormant state in the DRX period, the wireless terminal does not receive a message sent by the network side device, and some circuits of the wireless terminal are in a low power consumption state at this time. Similarly, in a DTX period, the wireless terminal also has two states, a dormant state and an awake state. The wireless terminal sends a message (such as a voice message or a network state paging message) to the network side device only in the awake state. When the wireless terminal is in the dormant state in the DTX period, the wireless terminal does not send a message to a network side, and some circuits of the wireless terminal are in a low power consumption state at this time.

In the prior art, when a wireless terminal is in a dormant state, some circuits of the wireless terminal are in a low power consumption state, but power is supplied to a radio frequency circuit all the time. If power is supplied to the radio frequency circuit for a long time, reliability and a service life of the radio frequency circuit are affected obviously, and some electric energy is also wasted.

SUMMARY

Embodiments of the present disclosure provide a power supply control method and a wireless terminal, which resolves problems of electric energy waste and service life reduction of a wireless terminal.

To resolve the foregoing technical problems, the embodiments of the present disclosure disclose the following technical solutions.

According to a first aspect of the present disclosure, a power supply control method is provided, and the method includes stopping supplying power to some or all circuits of a radio frequency circuit in the wireless terminal in a part or all of a time period during which a wireless terminal is in a dormant state, where the dormant state includes at least one of the following, a dormant state in a DTX period and a dormant state in a DRX period.

With reference to the first aspect, in a first possible implementation manner of the first aspect, the dormant state in the DTX period is dormant states in all DTX periods or dormant states in some DTX periods, and the dormant state in the DRX period is dormant states in all DRX periods or dormant states in some DRX periods. In the first possible implementation manner, power may be supplied to some or all circuits of the radio frequency circuit in a part or all of a time period of at least one dormant state in DRX or DTX periods, and a power-cutoff time period is more flexible and diverse.

With reference to the first aspect or the first possible implementation manner of the first aspect, in a second possible implementation manner of the first aspect, the radio frequency circuit includes a transmission processing circuit, a reception processing circuit, and an antenna switch, where stopping supplying power to some circuits of a radio frequency circuit in the wireless terminal further includes one or two of the following. Disconnecting an electronic switch located on a power supply line of the transmission processing circuit, disconnecting an electronic switch located on a power supply line of the reception processing circuit, and disconnecting an electronic switch located on a power supply line of the antenna switch, or stopping supplying power to all circuits of a radio frequency circuit in the wireless terminal includes disconnecting an electronic switch located on a power supply line of the transmission processing circuit, an electronic switch located on a power supply line of the transmission processing circuit, and an electronic switch located on a power supply line of the antenna switch.

With reference to the first aspect or the first possible implementation manner of the first aspect, in a third possible implementation manner of the first aspect, the radio frequency circuit includes a transmission processing circuit and a reception processing circuit, where the stopping supplying power to some circuits of a radio frequency circuit in the wireless terminal includes disconnecting an electronic switch located on a power supply line of the transmission processing circuit, or disconnecting an electronic switch located on a power supply line of the reception processing circuit, or the stopping supplying power to all circuits of a radio frequency circuit in the wireless terminal includes disconnecting an electronic switch located on a power supply line of the transmission processing circuit, and disconnecting an electronic switch located on a power supply line of the reception processing circuit.

With reference to the first aspect, the first possible implementation manner of the first aspect, the second possible implementation manner of the first aspect, or the third possible implementation manner of the first aspect, in a fourth possible implementation manner of the first aspect, the method further includes supplying power to all circuits of the radio frequency circuit in all other time periods than a time period during which power supply to all circuits or some circuits of the radio frequency circuit is cut off.

According to a second aspect of the present disclosure, a wireless terminal is provided, and the wireless terminal includes a communications unit, where the communications unit includes a power source processing circuit, a radio frequency circuit, a baseband control circuit, an antenna, and a switch circuit, where the radio frequency circuit is configured to receive a downlink analog signal sent by the antenna, convert the downlink analog signal into a downlink digital signal, and send the downlink digital signal to the baseband control circuit for processing, and receive an uplink digital signal sent by the baseband control circuit, convert the uplink digital signal into an uplink analog signal, and send the uplink analog signal to the antenna for transmitting. The power source processing circuit is configured to supply power to the baseband control circuit, receive a power source control signal sent by the baseband control circuit, and supply power to the radio frequency circuit according to the power source control signal. The switch circuit is located on a power supply line from the power source processing circuit to the radio frequency circuit, and is configured to receive a disconnect command of the baseband control circuit, and disconnect power supply lines of some or all circuits of the radio frequency circuit according to the disconnect command, where a dormant state includes at least one of the following: a dormant state in a DTX period and a dormant state in a DRX period, and the baseband control circuit is configured to receive the downlink digital signal sent by the radio frequency circuit, process the downlink digital signal to generate the uplink digital signal, send the uplink digital signal to the radio frequency circuit, and send the power source control signal to the power source processing circuit, and at the beginning of a part or all of a time period during which the wireless terminal is in the dormant state, send the disconnect command to the switch circuit.

With reference to the second aspect, in a first possible implementation manner of the second aspect, the dormant state in the DTX period is dormant states in all DTX periods or dormant states in some DTX periods, and the dormant state in the DRX period is dormant states in all DRX periods or dormant states in some DRX periods. Power is supplied to some or all circuits of the radio frequency circuit in a part or all of a time period of at least one dormant state in DRX or DTX periods, and a power-cutoff time period is more flexible and diverse. In the first possible implementation manner, power may be supplied to some or all circuits of the radio frequency circuit in a part or all of a time period of at least one dormant state in DRX or DTX periods, and a power-cutoff time period is more flexible and diverse.

With reference to the second aspect or the first possible implementation manner of the second aspect, in a second possible implementation manner of the second aspect, the radio frequency circuit includes a transmission processing circuit, a reception processing circuit, and an antenna switch, where the transmission processing circuit is configured to convert, according to a command of the baseband processing circuit, the uplink digital signal sent by the baseband control circuit on an uplink into the uplink analog signal, and send the uplink analog signal to the antenna switch. The reception processing circuit is configured to receive the downlink analog signal sent by the antenna switch, convert the downlink analog signal into the downlink digital signal, and send the downlink digital signal to the baseband control circuit for processing. The antenna switch is configured to receive, according to a time sequence requirement, the downlink analog signal sent by the antenna, and send the downlink analog signal to the reception processing circuit, and receive, according to a time sequence requirement, the uplink analog signal sent by the transmission processing circuit, and send the uplink analog signal to the antenna. The switch circuit includes an electronic switch, and the electronic switch is set on at least one of the following power supply lines: a power supply line from the power source processing circuit to the transmission processing circuit, a power supply line from the power source processing circuit to the reception processing circuit, and a power supply line from the power source processing circuit to the antenna switch. The electronic switch is configured to disconnect, according to the disconnect command, a power supply line on which the electronic switch is located, and the baseband control circuit is further configured to send the disconnect command to at least one of the electronic switches at the beginning of the part or all of the time period during which the wireless terminal is in the dormant state.

With reference to the second aspect or the first possible implementation manner of the second aspect, in a third possible implementation manner of the second aspect, the radio frequency circuit includes a transmission processing circuit and a reception processing circuit, where the transmission processing circuit is configured to convert, according to a command of the baseband processing circuit, the uplink digital signal sent by the baseband control circuit on an uplink into the uplink analog signal, and send the uplink analog signal to the antenna. The reception processing circuit is configured to receive the downlink analog signal sent by the antenna, convert the downlink analog signal into the downlink digital signal, and send the downlink digital signal to the baseband control circuit for processing. The switch circuit includes an electronic switch, and the electronic switch is set on at least one of the following power supply lines: a power supply line from the power source processing circuit to the transmission processing circuit and a power supply line from the power source processing circuit to the reception processing circuit. The electronic switch is configured to disconnect, according to the disconnect command, a power supply line on which the electronic switch is located, and the baseband control circuit is further configured to send the disconnect command to at least one of the electronic switches at the beginning of the part or all of the time period during which the wireless terminal is in the dormant state.

With reference to the second aspect or the first possible implementation manner of the second aspect, in a fourth possible implementation manner of the second aspect, the baseband control circuit is further configured to send a connect command to the switch circuit, to control the switch circuit to connect power supply lines of all circuits of the radio frequency circuit in all other time periods than the time period during which power supply to all circuits or some circuits of the radio frequency circuit is cut off at the end of a time period during which power supply to all circuits or some circuits of the radio frequency circuit is cut off, and the switch circuit is configured to receive the connect command, and connect power supply lines of all circuits of the radio frequency circuit according to the connect command.

With reference to the second possible implementation manner of the second aspect or the third possible implementation manner of the second aspect, in a fifth possible implementation manner of the second aspect, the baseband control circuit is further configured to send a connect command to all electronic switches that have already received the disconnect command at the end of a time period during which power supply to all circuits or some circuits of the radio frequency circuit is cut off, and the electronic switch is further configured to receive the connect command, and connect, according to the connect command, a power supply line on which the electronic switch is located.

It can be seen from the foregoing solutions that, according to the power supply control method and the wireless terminal provided in the embodiments of the present disclosure, when a wireless terminal is in a dormant state, it is not

DESCRIPTION OF EMBODIMENTS

According to a method and a wireless terminal provided in embodiments of the present disclosure, when a wireless terminal is in a dormant state, it is not necessary to supply power to all of a radio frequency circuit such that electric energy consumption of the wireless terminal is reduced, and a standby time is increased. Besides, because the radio frequency circuit does not need to be in a power supply state all the time, a service life of the radio frequency circuit in the wireless terminal is also increased. Specific implementation manners are described below with reference to accompanying drawings.

It may be understood that, all embodiments of the present disclosure are applicable to a case in which a wireless terminal is in an idle state, and in this case, only DTX or only DRX exists or both DTX and DRX exit. If the wireless terminal switches from the idle state to a connected state, a power supply control process mentioned in the embodiments terminates, and the wireless terminal performs processing according to a process in a connected state in the prior art.

It should be noted that, a wireless terminal in the following embodiments includes a mobile phone, a personal digital assistant (PDA), a wireless modem, a tablet computer, a notebook computer, a data card, a wearable device, or the like that can perform wireless communication with a network side device.

The embodiments of the present disclosure may be applied to various wireless communications systems in which a DRX period is used, such as a global system of mobile communication (GSM) system, a wideband code division multiple access (WCDMA) system, a code division multiple access (CDMA) system, and a long term evolution (LTE) system.

Figure 1:
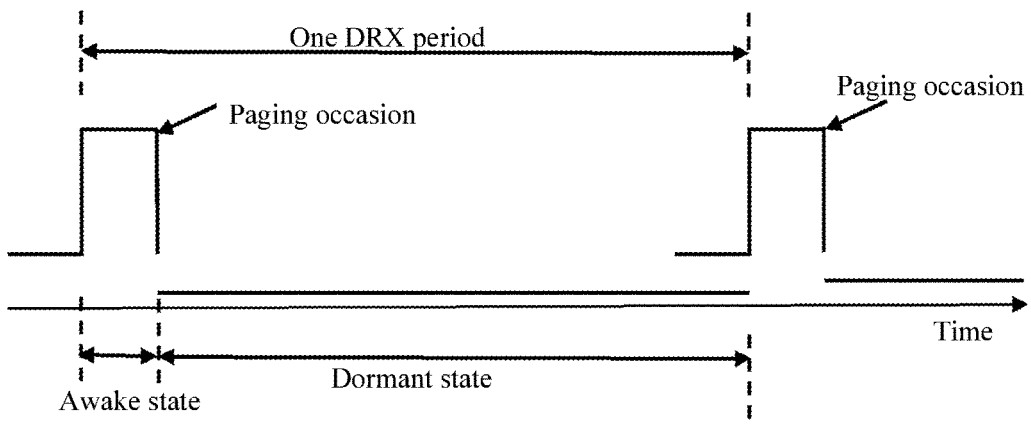
FIG. 1 is a diagram of a DRX state of a wireless terminal.
Figure 2:
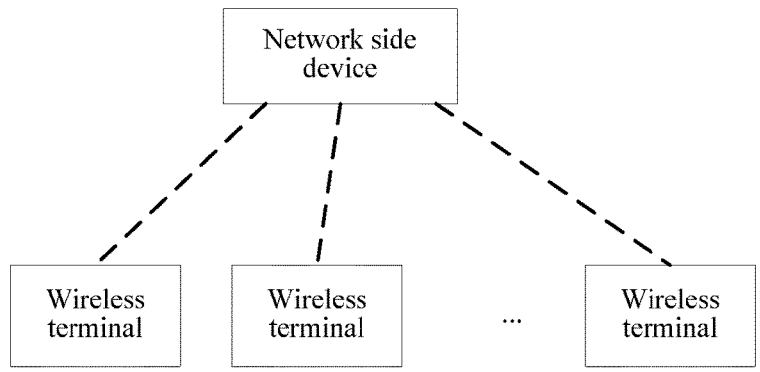
FIG. 2 is a schematic composition diagram of a wireless communications system.

As shown in FIG. 2, FIG. 2 shows a typical wireless communications system. The wireless communications system includes a network side device and a wireless terminal, and a dashed line between the network side device and the wireless terminal represents a link for transmitting uplink data and downlink data. Using a paging message as an example, the network side device herein may include a base station (for example, a Node B), a wireless network controller, and the like according to an actual requirement.

It should be noted that, in all the embodiments of the present disclosure, in a DRX period or a DTX period, a time period during which the wireless terminal is in a dormant state is referred to as a dormant time period, and a time period during which the wireless terminal is in an awake state is referred to as an awake time period. An entire time period of each DRX period is therefore divided into two time periods, and an entire time period of each DTX period is also similarly divided into two time periods.

Figure 3:
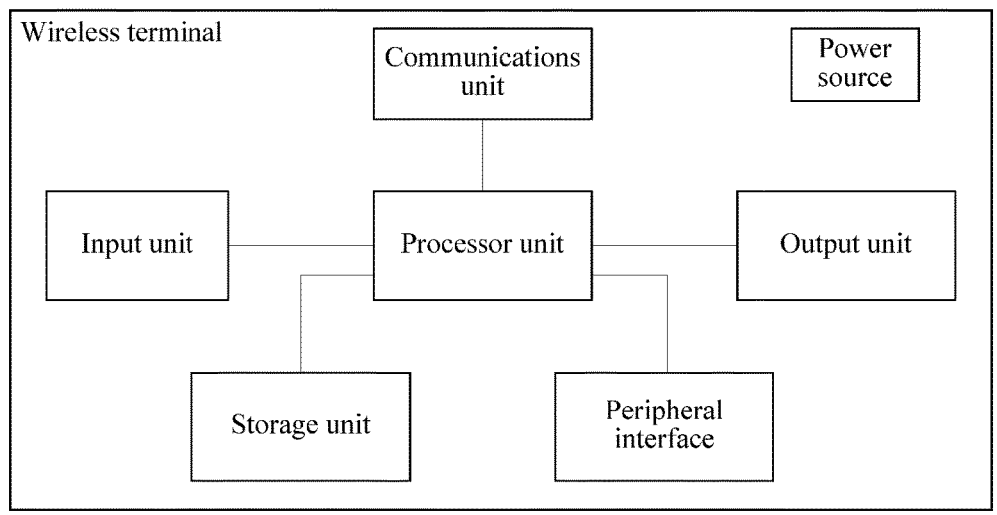
FIG. 3 is a schematic structural diagram of a wireless terminal according to an embodiment of the present disclosure.

As shown in FIG. 3, FIG. 3 is a schematic structural diagram of a wireless terminal according to an embodiment of the present disclosure. The wireless terminal includes components such as an input unit, a processor unit, an output unit, a communications unit, a storage unit, and a peripheral unit, and the like. These components perform communication using one or more buses. A person skilled in the art may understand that, a structure of the wireless terminal shown in the figure does not constitute a limitation on the present disclosure. The structure may be a bus structure, or may be a star structure, and may also include components more or less than those shown in the figure, or combine some components, or configure different components. For example, for the data card or the wireless modem, no input unit or output unit may be included, or even no power source is included. For the wearable device, no peripheral interface may be included.

The input unit is configured to implement interaction between a user and the wireless terminal and/or input information into the wireless terminal. For example, the input unit may receive number or character information input by the user in order to generate signal input related to user settings or function control. In a specific implementation manner of the present disclosure, the input unit may be a touch panel, or may be another human-computer interaction interface, such as a substantive input key or a microphone, or may be another device for capturing external information, such as a camera.

The processor unit is a control center of the wireless terminal, connects parts of the entire wireless terminal using various interfaces and lines, and runs or executes a software program and/or module stored in the storage unit and invokes data stored in the storage unit, to perform various functions of the wireless terminal and/or process data. The processor unit may include an integrated circuit (IC), for example, the processor unit may include a single packaged IC, or may be formed by connecting multiple packaged ICs that have a same function or different functions. For example, the processor unit may include only a central processing unit (CPU), or may be a combination of a CPU, a digital signal processor (DSP), and a control chip (such as a baseband chip) in the communications unit. In this implementation manner of the present disclosure, the CPU may be a single operation core, or may include multiple operation cores.

The communications unit is configured to establish a communication channel such that the wireless terminal is connected to a remote server using the communication channel, and downloads data from the remote server. The communications unit may include a communications module such as a wireless local area network (wireless LAN) module, a BLUETOOTH module, or a baseband module, and a radio frequency (RF) circuit corresponding to the communications module, and is configured to perform wireless local area network communication, BLUETOOTH communication, infrared communication, and/or cellular communications system communication, such as WCDMA and/or high speed downlink packet access (HSDPA). The communications module is configured to control communication of components in the wireless terminal, and can support direct memory access.

In a different implementation manner of the present disclosure, various communications modules in the communications unit are generally in a form of an integrated circuit chip, and can be combined selectively, but it is not necessary to include all the communications modules and corresponding antenna groups. For example, the communications unit may include only a baseband control circuit, a radio frequency circuit, and a corresponding antenna in order to provide a communication function in a cellular communications system. By means of a wireless communication connection established by the communications unit, such as wireless LAN access or WCDMA access, the wireless terminal may be connected to a cellular network or the Internet. In some optional implementation manners of the present disclosure, the communications module in the communications unit, such as the baseband control circuit, may be integrated into the foregoing processor unit, and a typical example is an application processor QUALCOMM and mobile data modem (APQ+MDM) series platform provided by QUALCOMM Inc.

The output unit includes, but is not limited to, an image output unit and a voice output unit. The image output unit is configured to output a text, a picture, and/or a video. The image output unit may include a display panel, such as a display panel that is configured in a form of a liquid crystal display (LCD), an organic light-emitting diode (OLED), or a field emission display (FED). Alternatively, the image output unit may include a reflective display, such as an electrophoretic display, or a display in which interferometric modulation of light is used. The image output unit may include a single display or multiple displays having different sizes.

The storage unit may be configured to store a software program and module. The processing unit runs the software program and module stored in the storage unit, to execute various functional applications of the wireless terminal and implement data processing. The storage unit mainly includes a program storage area and a data storage area. An operating system and an application program required by at least one function, such as a sound playback program or an image display program, may be stored in the program storage area. Data (such as audio data and an address book) created according to use of the wireless terminal and other data may be stored in the data storage area. In specific implementation manners of the present disclosure, the storage unit may include a volatile memory, such as a nonvolatile dynamic random access memory (NVRAM), a phase change random access memory (PRAM), or a magnetoresistive random access memory (MRAM), and may also include a nonvolatile memory, such as at least one magnetic disk storage device, an electrically erasable programmable read-only memory (EEPROM), or a flash memory such as a negative-OR (NOR) flash memory or a negative-AND (NAND) flash memory. The non-volatile memory stores an operating system and an application program that are executed by the processing unit. The processing unit loads, from the non-volatile memory, a running program and data into the memory, and stores digital content into a mass storage device. The operating system includes various components and/or drives that are configured to control and manage common system tasks, such as memory management, storage device control, and power source management, and components and/or drives that contribute to communication between various software and hardware. In implementation manners of the present disclosure, the operating system may be an ANDROID system of Google Inc., an iOS system developed by Apple Computer, Inc., a WINDOWS operating system developed by the Microsoft Corporation, or an embedded operating system such as VXWORKS.

The peripheral interface is an interface that connects to a peripheral device, and includes, but is not limited to, a universal serial bus (USB) interface, a personal computer memory card international association (PCMCIA) interface, or the like.

The power source in the figure is configured to supply power to different components of the wireless terminal, to keep the wireless terminal running. As a general understanding, the power source may be a built-in battery, such as a common lithium-ion battery or nickel-metal hydride (NiMH) battery, or may include an externally-connected power source that directly supplies power to the wireless terminal.

Figure 4:
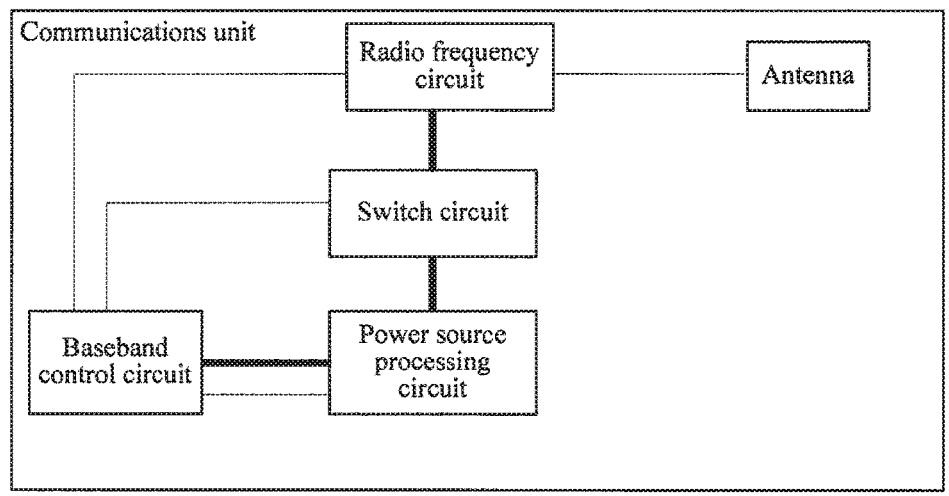
FIG. 4 is a schematic structural diagram of a communications unit according to an embodiment of the present disclosure.

As shown in FIG. 4, FIG. 4 is a schematic structural diagram of a communications unit according to an embodiment of the present disclosure. The communications unit includes a power source control circuit, a radio frequency circuit, a baseband control circuit, an antenna, and a switch circuit. There are two types of connection lines between circuits in FIG. 4, where a thicker connection line represents a power supply relationship, and a thinner connection line represents a signal transmission relationship.

The radio frequency circuit is configured to receive a downlink analog signal sent by the antenna, convert the downlink analog signal into a downlink digital signal, and send the downlink digital signal to the baseband control circuit for processing, and receive an uplink digital signal sent by the baseband control circuit, convert the uplink digital signal into an uplink analog signal, and send the uplink analog signal to the antenna for transmitting. It should be noted that, the "uplink digital signal" and the "uplink analog signal" herein respectively refer to a digital signal and an analog signal that are sent by a wireless terminal to a network side device, and the "downlink digital signal" and the "downlink analog signal" respectively refer to a digital signal and an analog signal that are sent by the network side device to the wireless terminal.

The power source processing circuit is configured to supply power to the baseband control circuit, receive a power source control signal sent by the baseband control circuit, and supply power to the radio frequency circuit according to the power source control signal. In FIG. 4, a relationship between the power source processing circuit and the power source in FIG. 3 is omitted. It may be understood that, the power source processing circuit in FIG. 4 may include a power source and a circuit that processes and allocates electric energy provided by the power source, or may include only a circuit that processes and allocates electric energy provided by a power source.

The switch circuit is located on a power supply line from the power source processing circuit to the radio frequency circuit, and is configured to receive a disconnect command of the baseband control circuit, and disconnect power supply lines of some or all circuits of the radio frequency circuit according to the disconnect command, where a dormant state includes at least one of the following a dormant state in a DTX period and a dormant state in a DRX period. There are at least one DTX period and at least one DRX period. Power is supplied to some or all circuits of the radio frequency circuit in a part or all of a time period of at least one dormant state in DRX or DTX periods, and a power-cutoff time period is more flexible and diverse.

The baseband control circuit is configured to receive the downlink digital signal sent by the radio frequency circuit, process the downlink digital signal to generate the uplink digital signal, send the uplink digital signal to the radio frequency circuit, and send the power source control signal to the power source processing circuit, and send the disconnect command to the switch circuit at the beginning of a part or all of a time period during which the wireless terminal is in the dormant state.

It should be noted that, during specific implementation, when it is determined that a wireless terminal enters a power saving function (for example, the wireless terminal receives a command, input by a user, of entering a power saving mode, or the wireless terminal automatically detects that a quantity of remaining electricity is lower than a threshold, or the wireless terminal detects that the wireless terminal is currently in a set time period or detects that the wireless terminal is in a set location a set location, or the wireless terminal automatically executes the power saving function after startup), power supply to the baseband control circuit may be maintained all the time. The baseband control circuit keeps timing, and sends the disconnect command to the switch circuit at the beginning of a time period during which power supply to all or some circuits of the radio frequency circuit is stopped (that is, a part or all of a time period during which the wireless terminal is in a dormant state). After receiving the disconnect command, the switch circuit immediately disconnects a power supply line on which the switch circuit is located, to cut off power supply to a part or all of the radio frequency circuit. In this case, an entire response time during which the switch circuit receives the disconnect command and performs disconnection is very short compared with an entire time period during which power supply to all or some circuits of the radio frequency circuit is stopped, and therefore, the response time may be ignored. Obviously, a time during which power supply to some or all circuits of the radio frequency circuit is stopped is not greater than a time during which the wireless terminal is in the dormant state.

The time period during which power supply to all or some circuits of the radio frequency circuit is stopped may further include the following eight time periods.

(a) All of a dormant time period in a DTX period of the wireless terminal;

(b) A part of a dormant time period in a DTX period of the wireless terminal;

(c) All of a dormant time period in a DRX period of the wireless terminal;

(d) A part of a dormant time period in a DRX period of the wireless terminal;

(e) The time periods of (a) and (c);

(f) The time periods of (a) and (d);

(g) The time periods of (b) and (c); and (h) The time periods of (b) and (c).

All of the dormant time period in the DTX period refers to an entire dormant time period in the DTX period, and there is at least one DTX period. The part of the dormant time period in the DTX period refers to a part of the dormant time period in the DTX period, for example, the first one-half of a dormant time period in one DTX period, or the first one-third of dormant time periods in all DTX periods, and there is at least one DTX period.

All of the dormant time period in the DRX period refers to an entire dormant time period in the DRX period, and there is at least one DRX period. The part of the dormant time period in the DRX period refers to a part of the dormant time period in the DRX period, for example, the first one-half of a dormant time period in one DRX period, or the first one-third of dormant time periods in all DRX periods, and there is at least one DRX period.

Optionally, in this embodiment of the present disclosure, stopping supplying power to all or some circuits of the radio frequency circuit in the foregoing eight time periods refers to stopping supplying power to all or some circuits of the radio frequency circuit only in the eight time periods. Using (a) as an example, power supply to all or some circuits of the radio frequency circuit is stopped only in all of the dormant time period in the DTX period of the wireless terminal, and in all other time periods than all of the dormant time period in the DTX period, power supply to all circuits of the radio frequency circuit is restored. The case is similar for the remaining (b) to (h), and details are not described herein again. Restoring power supply to all circuits of the radio frequency circuit may be as follows. At the end of a time period during which power supply to all circuits or some circuits of the radio frequency circuit in the wireless terminal is stopped, sending, by the baseband control circuit, a connect command to the switch circuit that has already received the disconnect command, to connect the power supply line that had been disconnected before. A response time spent in an entire process in which the switch circuit receives the connect command and then performs connection is very short compared with the time period during which power supply to all or some circuits of the radio frequency circuit is stopped and the time period during which power supply to all circuits of the radio frequency circuit is maintained, and therefore, the response time may be ignored.

It may be understood that, the time period during which power supply to all or some circuits of the radio frequency circuit is stopped may include only one continuous time period, for example, the first one-half or the first one-third of a dormant time period in one DRX period, or may also include multiple discontinuous time periods, for example, all of a dormant time period in each DRX period, or the first one-half of a dormant time period in each DTX period, or a combination of cases of (a) to (h).

If the time period during which power supply to all or some circuits of the radio frequency circuit is stopped is a case of (e) to (h), when the wireless terminal currently performs both DTX and DRX, a special case may exist, that is, the wireless terminal is currently in a DRX dormant time period but not in a DTX dormant time period, or the wireless terminal is currently in a DTX dormant time period but not in a DRX dormant time period. To ensure normal proceeding of DTX or DRX, power supply to related circuits of the radio frequency circuit needs to be maintained, and to simplify a design, it may be designed that power supply to all or some circuits of the radio frequency circuit is stopped only when the wireless terminal is currently both in a DTX dormant time period and in a DRX dormant time period. In other words, "(a) and (c)" in (e) means that both (a) and (c) are satisfied. Meanings of (f) to (h) are similar.

Another embodiment of the present disclosure further provides a wireless terminal that uses the foregoing communications unit. In addition to the foregoing communications unit, the wireless terminal may also include, for example, other units shown in FIG. 3 as required. For data transmission or connection relationships between the communications unit and the other units, reference may be made to descriptions of FIG. 3, and details are not described herein again.

If the communications unit provided in this embodiment is used by the wireless terminal, when the wireless terminal is in the dormant state, it is not necessary to supply power to all of a radio frequency circuit such that electric energy consumption of the wireless terminal is reduced, and a standby time is increased. Besides, reliability of the radio frequency circuit gradually decreases in a case in which power is supplied to the radio frequency circuit for a long time, and therefore, a service life of the radio frequency circuit in the wireless terminal is also increased in this embodiment of the present disclosure.

Optionally, the dormant state in the DTX period is dormant states in all DTX periods or dormant states in some DTX periods, and the dormant state in the DRX period is dormant states in all DRX periods or dormant states in some DRX periods.

It means that to provide further details on the basis of the foregoing time periods (a) to (h) during which power supply is stopped, power supply to some or all circuits of the radio frequency circuit may be stopped in the following eight time periods.

(1) All or a part of a dormant time period in each DTX period of the wireless terminal;
(2) All or a part of a dormant time period in some DTX periods of the wireless terminal;
(3) All or a part of a dormant time period in each DRX period of the wireless terminal;
(4) All or a part of a dormant time period in some DRX periods of the wireless terminal;
(5) The time periods of (1) and (3);
(6) The time periods of (2) and (4);
(7) The time periods of (1) and (4); and
(8) The time periods of (2) and (3).

There are multiple manners of selecting the some DTX periods in (2) and the some DTX periods in (4), for example, one period is selected from every two consecutive periods, one or two periods are selected from every three consecutive periods, or first two periods are selected from every four consecutive periods. Suitable "some periods" may be selected during selection based on algorithm complexity, power saving efficiency, and the like, and a selection manner does not constitute a limitation on the present disclosure. It may be understood that, when a total power-cutoff time is longer, a power saving effect is more obvious. When a total time of power saving is relatively short, although a power saving effect is relatively weak, work load of the baseband control circuit and the switch circuit is relatively small.

Although the time period is classified into the foregoing eight cases, it may be understood that, each case of (1) to (4) actually includes two cases: "all" and "a part", and each case of (5) to (8) actually includes four cases: "all of a DTX period+a part of a DRX period", "all of a DTX period+all of a DRX period", "a part of a DTX period+a part of a DRX period", and "a part of a DTX period+a part of a DRX period", and division of the foregoing eight cases (1) to (8) is only for ease of description.

Optionally, in this embodiment of the present disclosure, stopping supplying power to all or some circuits of the radio frequency circuit in the foregoing eight time periods refers to stopping supplying power to all or some circuits of the radio frequency circuit only in the eight time periods. Using (1) as an example, power supply to all or some circuits of the radio frequency circuit is stopped only in all or a part of the dormant time period in each DTX period of the wireless terminal. Furthermore, if power supply is stopped in all of the dormant time period in each DTX period of the wireless terminal, power supply to all circuits of the radio frequency circuit is restored in all other time periods than all of the dormant time period in each DTX period of the wireless terminal. If power supply is stopped in a part of the dormant time period in each DTX period of the wireless terminal, power supply to all circuits of the radio frequency circuit is restored in all other time periods than the part of the dormant time period in each DTX period of the wireless terminal. Restoring power supply to all circuits of the radio frequency circuit may be as follows. At the end of a time period during which power supply to some circuits of the radio frequency circuit in the wireless terminal is stopped, sending, by the baseband control circuit, a connect command to the switch circuit that has already received the disconnect command, to connect the power supply line that has been disconnected before.

If cutting off power supply to all circuits or some circuits of the radio frequency circuit in a time period of (2) to (8) is selected, implementation manners are similar, and details are not described herein again.

Optionally, cutting off power supply to all circuits or some circuits of the radio frequency circuit in a time period of (1) to (8) may not only be understood as a single power saving solution, for example, stopping power supply to all circuits of the radio frequency circuit in all of a dormant time period of each DRX period, and but also be understood as a combination of multiple power saving solutions, for example, cutting off power supply to all circuits of the radio frequency circuit in all of a dormant time period of each DRX period and cutting off power supply to one circuit in the radio frequency circuit in all of a dormant time period of each DTX period, and for another example, cutting off power supply to two circuits of the radio frequency circuit in all of a dormant time period of one DRX period in every two consecutive DRX periods and cutting off power supply to one circuit in the radio frequency circuit in all of a dormant time period of one DTX period in every three consecutive DTX periods. By analogy, a person skilled in the art may figure out multiple power saving solutions and a combination thereof, and details are not described herein again.

During specific implementation, a suitable power saving time period (such as the time periods described in (1) to (8)) and power saving range (all circuits or some circuits of the radio frequency circuit) may be designed as required.

If the time period during which power supply to all or some circuits of the radio frequency circuit is stopped is a case of (5) to (8), when the wireless terminal currently performs both DTX and DRX, a special case may exist, that is, the wireless terminal is currently in a DRX dormant time period but not in a DTX dormant time period, or the wireless terminal is currently in a DTX dormant time period but not in a DRX dormant time period. To ensure normal proceeding of DTX or DRX, power supply to related circuits of the radio frequency circuit needs to be maintained, and to simplify a design, it may be designed that power supply to all or some circuits of the radio frequency circuit is stopped only when the wireless terminal is currently both in a DTX dormant time period and in a DRX dormant time period. In other words, "(1) and (3)" in (5) means that both (1) and (3) are satisfied. Meanings of (6) to (8) are similar.

Correspondingly, the baseband control circuit is further configured to send a connect command to the switch circuit, to control the switch circuit to connect power supply lines of all circuits of the radio frequency circuit in all other time periods than the time period during which power supply to all circuits or some circuits of the radio frequency circuit is cut off, and the switch circuit is configured to receive the connect command, and connect power supply lines of all circuits of the radio frequency circuit according to the connect command. This solution ensures that, in the wireless terminal, at the end of the time period during which power supply to some circuits of the radio frequency circuit in the wireless terminal is stopped, the radio frequency circuit can obtain power supply and work normally. It may be understood that, power supply to the baseband control circuit may be maintained all the time, and the baseband control circuit keeps timing, and sends the connect command to the switch circuit at the end of the time period during which power supply to some circuits of the radio frequency circuit in the wireless terminal is stopped, to connect the power supply line that is disconnected before.

Furthermore, if power supply to all circuits of the radio frequency circuit is cut off in all of a dormant time period of each DRX period, the baseband control circuit keeps timing. At the beginning of a dormant time period of an $N^{th}$ DRX period, the baseband control circuit sends the disconnect command to the switch circuit, and the switch circuit cuts off power supply to all circuits in the radio frequency circuit. At the end of the dormant time period of the $N^{th}$ DRX period (that is, the beginning of an awake time period of the $N^{th}$ DRX period), the baseband control circuit sends the connect command to the switch circuit, and the switch circuit turns on power supply of all circuits in the radio frequency circuit. At the end of the awake time period of the $N^{th}$ DRX period (that is, the beginning of a dormant time period of an $(N+1)^{th}$ DRX period), the baseband control circuit sends the disconnect command to the switch circuit, and the switch circuit cuts off power supply to all circuits in the radio frequency circuit, and by analogy, N is a positive integer, and it is assumed that in the $N^{th}$ DRX period, the wireless terminal does not receive a message (such as a paging message) that needs to be processed by the wireless terminal. In this case, after the $N^{th}$ DRX period ends, the process proceeds to the $(N+1)^{th}$ DRX period. If in the $N^{th}$ DRX period, the wireless terminal receives a message (such as a paging message) that needs to be processed by the wireless terminal, the wireless terminal switches from an idle state to a connected state, processes the paging message in a prior-art manner, and continues the foregoing power supply control process when the wireless terminal enters the idle state again and continues to perform DRX according to a DRX period.

Figure 5A:
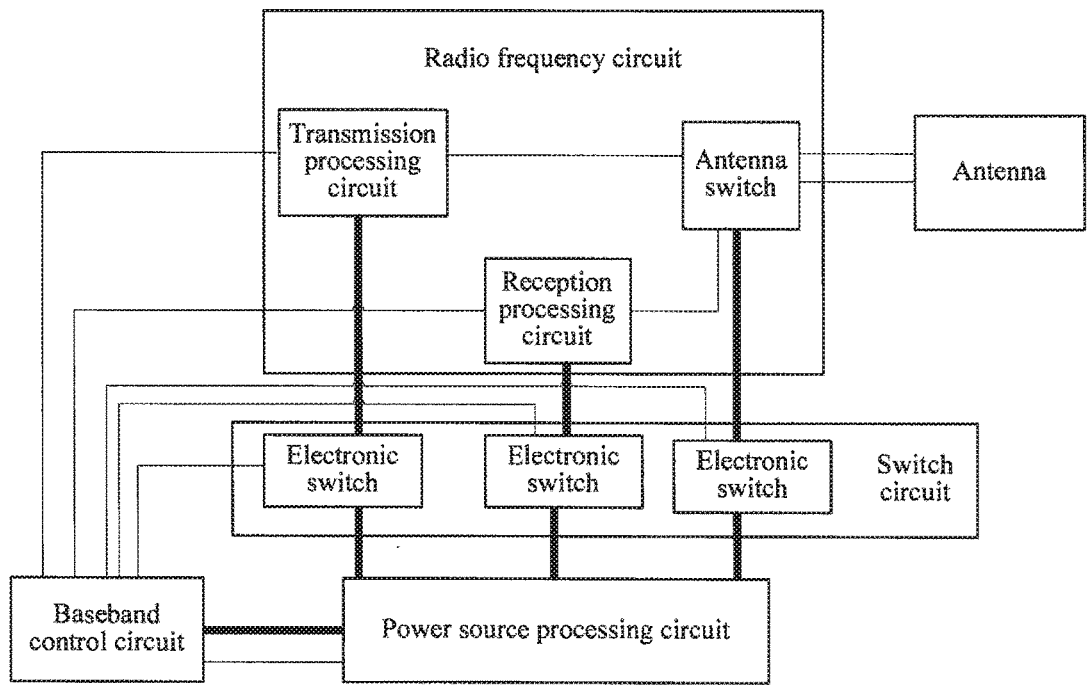
FIG. 5A is a schematic structural diagram of a communications unit according to another embodiment of the present disclosure.

As shown in FIG. 5A, FIG. 5A is a schematic structural diagram of a communications unit according to another embodiment of the present disclosure. On a basis of FIG. 4, FIG. 5A provides further details about specific implementation of the radio frequency circuit. There are two types of connection lines between circuits, where a thicker connection line represents a power supply relationship, and a thinner connection line represents a signal transmission relationship.

In addition to the foregoing descriptions of the embodiment of FIG. 4, newly added content of this embodiment includes the radio frequency circuit includes a transmission processing circuit, a reception processing circuit, and an antenna switch.

The transmission processing circuit is configured to convert, according to a command of the baseband processing circuit, the uplink digital signal sent by the baseband control circuit on an uplink into the uplink analog signal, and send the uplink analog signal to the antenna switch.

The reception processing circuit is configured to receive the downlink analog signal sent by the antenna switch, convert the downlink analog signal into the downlink digital signal, and send the downlink digital signal to the baseband control circuit for processing.

The antenna switch is configured to receive, according to a time sequence requirement, the downlink analog signal sent by the antenna, and send the downlink analog signal to the reception processing circuit, and receive, according to a time sequence requirement, the uplink analog signal sent by the transmission processing circuit, and send the uplink analog signal to the antenna. For the foregoing various uplink data and downlink data, reference may be made to descriptions in the foregoing embodiment.

The switch circuit includes an electronic switch, and the electronic switch is set on at least one of the following power supply lines a power supply line from the power source processing circuit to the transmission processing circuit, a power supply line from the power source processing circuit to the reception processing circuit, and a power supply line from the power source processing circuit to the antenna switch.

The electronic switch is configured to disconnect, according to the disconnect command, a power supply line on which the electronic switch is located.

The baseband control circuit is further configured to send the disconnect command to at least one of the electronic switches at the beginning of the part or all of the time period during which the wireless terminal is in the dormant state. This function is to control the electronic switch that receives the disconnect command to disconnect, in the part or all of the time period during which the wireless terminal is in the dormant state, the power supply line on which the electronic switch that receives the disconnect command is located.

Another embodiment of the present disclosure further provides a wireless terminal on which the foregoing communications unit is used. In addition to the foregoing communications unit, the wireless terminal may also include, for example, other units shown in FIG. 3, as required. For data transmission or connection relationships between the communications unit and the other units, reference may be made to descriptions of FIG. 3, and details are not described herein again.

If the communications unit provided in this embodiment is used by the wireless terminal, when the wireless terminal is in the dormant state, it is not necessary to supply power to all of a radio frequency circuit such that electric energy consumption of the wireless terminal is reduced, a standby time is increased, and a service life of the radio frequency circuit in the wireless terminal is also increased, besides, in this embodiment, because one or more electronic switches are used in the switch circuit, the entire solution is simple, effective, and flexible, and hardware costs are relatively low.

The switch circuit in FIG. 5A includes three electronic switches. The three electronic switches are respectively located on the power supply line from the power source processing circuit to the transmission processing circuit, the power supply line from the power source processing circuit to the reception processing circuit, and the power supply line from the power source processing circuit to the antenna switch. When it is determined that the wireless terminal enters a power saving function (for example, the wireless terminal receives a command selected by a user, or the wireless terminal automatically detects that a quantity of remaining electricity is lower than a threshold, or the wireless terminal detects a set time period or a set location), power supply to the baseband control circuit may be maintained all the time. The baseband control circuit keeps timing, and sends the disconnect command to at least one of the three electronic switches at the beginning of a time period during which power supply to the radio frequency circuit is stopped (that is, the part or all of the time period during which the wireless terminal is in the dormant state), and the electronic switch that receives the disconnect command immediately disconnects a power supply line on which the electronic switch is located, to cut off power supply to a part or all of the radio frequency circuit. Because the three electronic switches respectively control the three power supply lines, power cutoff is more targeted, and a power cutoff solution is more flexible. If some electronic switches are faulty, remaining electronic switches that are not faulty can till implement power cutoff, which improves stability of the solution.

Figure 5B:
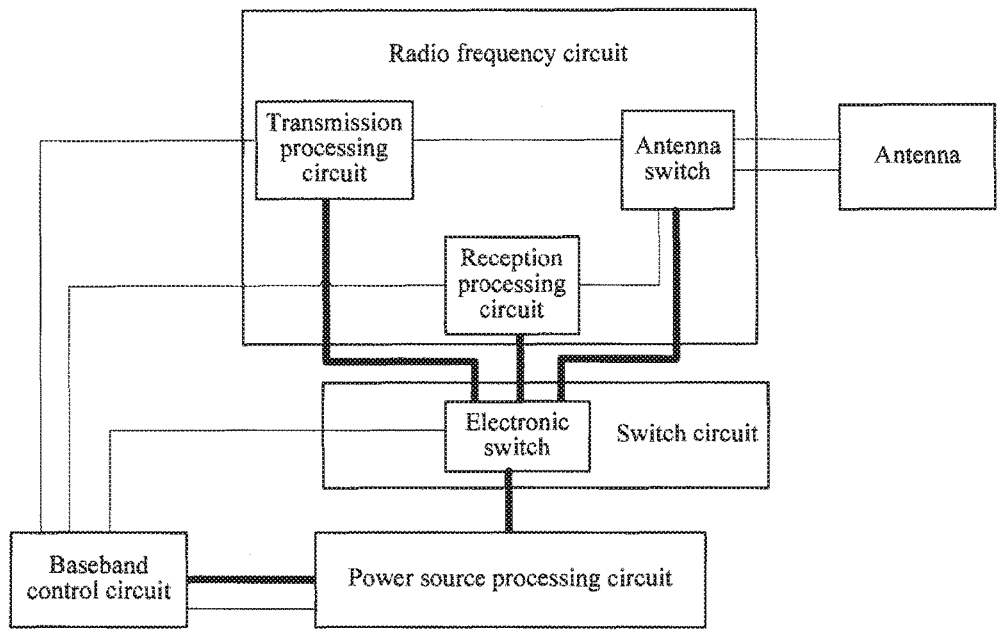
FIG. 5B is a schematic structural diagram of a communications unit according to another embodiment.

As shown in FIG. 5B, FIG. 5B is a schematic structural diagram of a communications unit according to another embodiment of the present disclosure. Different from FIG. 5A, a switch circuit in FIG. 5B includes one electronic switch. The electronic switch is located on all of the power supply line from the power source processing circuit to the transmission processing circuit, the power supply line from the power source processing circuit to the reception processing circuit, and the power supply line from the power source processing circuit to the antenna switch, and the three power supply lines are controlled simultaneously by means of turn-on or turn-off of the electronic switch. When it is determined that the wireless terminal enters a power saving function (for example, the wireless terminal receives a command selected by a user, or the wireless terminal automatically detects that a quantity of remaining electricity is lower than a threshold, or the wireless terminal detects a set time period or a set location), power supply to the baseband control circuit may be maintained all the time. The baseband control circuit keeps timing, and sends the disconnect command to the electronic switch at the beginning of a time period during which power supply to the radio frequency circuit is stopped (that is, the part or all of the time period during which the wireless terminal is in the dormant state), and after receiving the disconnect command, the electronic switch immediately disconnects the power supply lines on which the electronic switch is located, to cut off power supply to all of the radio frequency circuit. In this solution, only one electronic switch is used, which can disconnect three lines simultaneously such that power cutoff efficiency is higher, and hardware costs are lower.

Optionally, the foregoing electronic switch may also be implemented in another implementation manner. For example, two of the three lines, that is, the power supply line from the power source processing circuit to the transmission processing circuit, the power supply line from the power source processing circuit to the reception processing circuit, and the power supply line from the power source processing circuit to the antenna switch, share one electronic switch, and one electronic switch is used in another line. The baseband control circuit sends, at the beginning of a time period during which power supply to the radio frequency circuit is stopped (that is, the part or all of the time period during which the wireless terminal is in the dormant state), the disconnect command to at least one of the two electronic switches, and the electronic switch that receives the disconnect command immediately disconnects a power supply line on which the electronic switch is located, to cut off power supply to a part or all of the radio frequency circuit. In this solution, there are two electronic switches, even if one electronic switch is faulty, the other electronic switch that is not faulty may be used to complete power cutoff, and the solution provides greater stability. Besides, because two lines share one electronic switch, power cutoff efficiency is higher, and hardware costs are lower.

Optionally, the foregoing electronic switch may also include four electronic switches in total, one of the switches serves as a main switch of the three lines, that is, the power supply line from the power source processing circuit to the transmission processing circuit, the power supply line from the power source processing circuit to the reception processing circuit, and the power supply line from the power source processing circuit to the antenna switch, and the other three electronic switches are branch switches and are respectively located on the three lines. The baseband control circuit sends, at the beginning of a time period during which power supply to the radio frequency circuit is stopped (that is, the part or all of the time period during which the wireless terminal is in the dormant state), the disconnect command to the main switch to cut off power supply to all of the radio frequency circuit, or sends the disconnect command to the three branch switches simultaneously, to cut off power supply to all of the radio frequency circuit, or sends the disconnect command to one or two of the three branch switches, to cut off power supply to a part of the radio frequency circuit. In this solution, not only a main switch but also branch switches are configured, a power cutoff solution can be selected flexibly as required, and even if some electronic switches are faulty, an electronic switch that is not faulty may be used to complete power cutoff, and therefore, the solution provides greater stability.

Figure 5C:
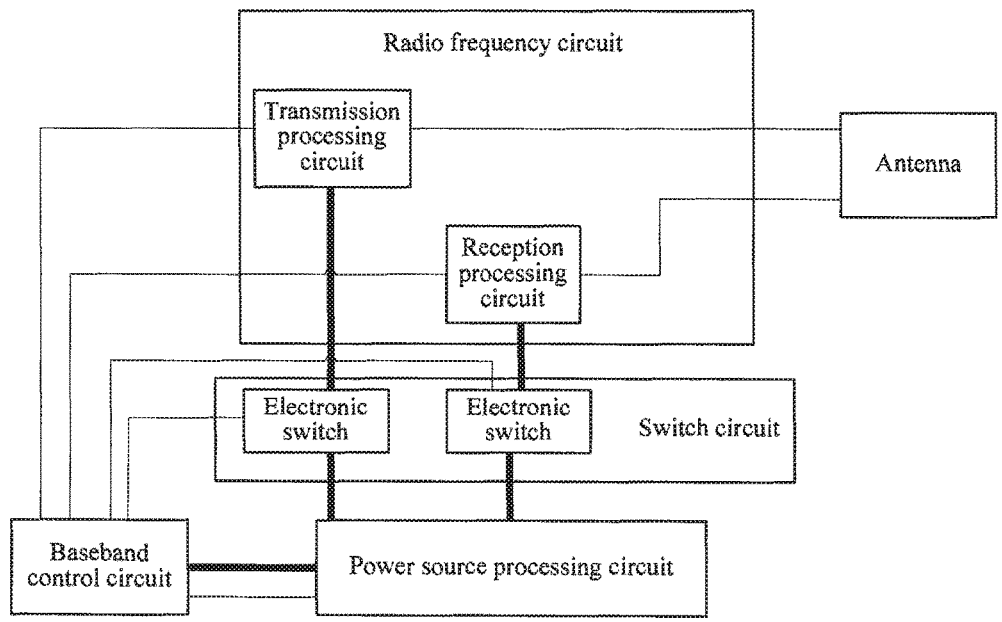
FIG. 5C is a schematic structural diagram of a communications unit according to another embodiment.
Figure 5D:
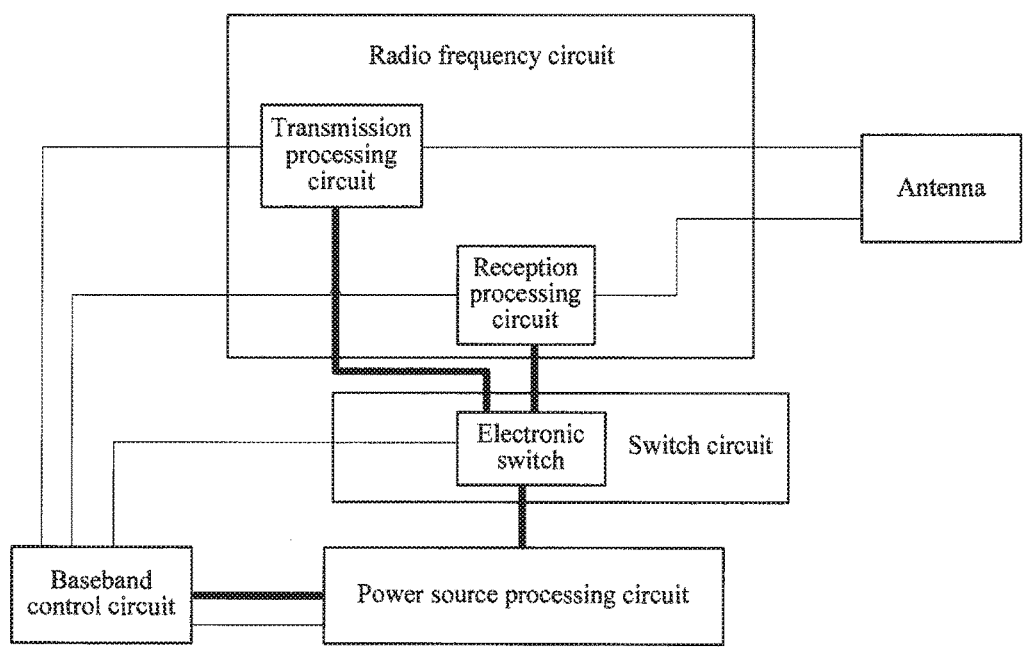
FIG. 5D is a schematic structural diagram of a communications unit according to another embodiment.

It should be noted that, it should be noted that, in descriptions of embodiments of FIG. 5C and FIG. 5D, composition division of the radio frequency circuit is mainly based on functions. In an actual product, functions of one circuit may be implemented by multiple chips, or multiple circuits may be implemented in one chip, for example, the reception processing circuit, the transmission processing circuit, and the antenna switch may be combined into one chip.

As shown in FIG. 5C, FIG. 5C is a schematic structural diagram of a communications unit according to another embodiment of the present disclosure. On a basis of FIG. 4, FIG. 5C provides further details about specific implementation of the radio frequency circuit. There are two types of connection lines between circuits, where a thicker connection line represents a power supply relationship, and a thinner connection line represents a signal transmission relationship.

In addition to the foregoing descriptions of the embodiment of FIG. 4, newly added content of this embodiment includes the radio frequency circuit which includes a transmission processing circuit and a reception processing circuit.

The transmission processing circuit is configured to convert, according to a command of the baseband processing circuit, the uplink digital signal sent by the baseband control circuit on an uplink into the uplink analog signal, and send the uplink analog signal to the antenna.

The reception processing circuit is configured to receive the downlink analog signal sent by the antenna, convert the downlink analog signal into the downlink digital signal, and send the downlink digital signal to the baseband control circuit for processing.

The switch circuit includes an electronic switch, and the electronic switch is set on at least one of the following power supply lines: a power supply line from the power source processing circuit to the transmission processing circuit and a power supply line from the power source processing circuit to the reception processing circuit.

The electronic switch is configured to disconnect, according to the disconnect command, a power supply line on which the electronic switch is located.

The baseband control circuit is further configured to send the disconnect to at least one of the electronic switches at the beginning of the part or all of the time period during which the wireless terminal is in the dormant state. This function is to control the electronic switch that receives the disconnect command to disconnect, in the part or all of the time period during which the wireless terminal is in the dormant state, the power supply line on which the electronic switch that receives the disconnect command is located.

Another embodiment of the present disclosure further provides a wireless terminal on which the foregoing communications unit is used. In addition to the foregoing communications unit, the wireless terminal may also include, for example, other units shown in FIG. 3 as required. For data transmission or connection relationships between the communications unit and the other units, reference may be made to descriptions of FIG. 3, and details are not described herein again.

If the communications unit provided in this embodiment is used by the wireless terminal, when the wireless terminal is in the dormant state, it is not necessary to supply power to all of a radio frequency circuit such that electric energy consumption of the wireless terminal is reduced, a standby time is increased, and a service life of the radio frequency circuit in the wireless terminal is also increased, besides, in this embodiment, because one or more electronic switches are used in the switch circuit, the entire solution is simple, effective, and flexible, and hardware costs are low.

The switch circuit in FIG. 5C includes two electronic switches. The two electronic switches are respectively located on the power supply line from the power source processing circuit to the transmission processing circuit and the power supply line from the power source processing circuit to the reception processing circuit. When it is determined that the wireless terminal enters a power saving function (for example, the wireless terminal receives a command selected by a user, or the wireless terminal automatically detects that a quantity of remaining electricity is lower than a threshold, or the wireless terminal detects a set time period or a set location), power supply to the baseband control circuit may be maintained all the time. The baseband control circuit keeps timing, and sends the disconnect command to at least one of the two electronic switches at the beginning of a time period during which power supply to the radio frequency circuit is stopped (that is, the part or all of the time period during which the wireless terminal is in the dormant state), and the electronic switch that receives the disconnect command immediately disconnects a power supply line on which the electronic switch is located, to cut off power supply to a part or all of the radio frequency circuit. Because the two electronic switches respectively control the two power supply lines, power cutoff is more targeted, and a power cutoff solution is more flexible. If one electronic switch is faulty, the remaining electronic switch that is not faulty can till implement power cutoff, which improves stability of the solution.

As shown in FIG. 5D, FIG. 5D is a schematic structural diagram of a communications unit according to another embodiment of the present disclosure. Different from FIG. 5C, a switch circuit in FIG. 5D includes one electronic switch. The electronic switch is located on both the power supply line from the power source processing circuit to the transmission processing circuit and the power supply line from the power source processing circuit to the reception processing circuit, and the three power supply lines are controlled simultaneously by means of turn-on or turn-off of the electronic switch. When it is determined that the wireless terminal enters a power saving function (for example, the wireless terminal receives a command selected by a user, or the wireless terminal automatically detects that a quantity of remaining electricity is lower than a threshold, or the wireless terminal detects a set time period or a set location), power supply to the baseband control circuit may be maintained all the time. The baseband control circuit keeps timing, and sends the disconnect command to the electronic switch at the beginning of a time period during which power supply to the radio frequency circuit is stopped (that is, the part or all of the time period during which the wireless terminal is in the dormant state), and after receiving the disconnect command, the electronic switch immediately disconnects the power supply lines on which the electronic switch is located, to cut off power supply to all of the radio frequency circuit. In this solution, only one electronic switch is used, which can disconnect three lines simultaneously such that power cutoff efficiency is higher, and hardware costs are lower.

Optionally, the foregoing electronic switch may also include three electronic switches in total, one of the switches serves as a main switch of the two lines, that is, the power supply line from the power source processing circuit to the transmission processing circuit and the power supply line from the power source processing circuit to the reception processing circuit, and the other two electronic switches are branch switches and are respectively located on the two lines. The baseband control circuit sends, at the beginning of a time period during which power supply to the radio frequency circuit is stopped (that is, the part or all of the time period during which the wireless terminal is in the dormant state), the disconnect command to the main switch to cut off power supply to all of the radio frequency circuit, or sends the disconnect command to the two branch switches simultaneously, to cut off power supply to all of the radio frequency circuit, or sends the disconnect command to one of the two branch switches, to cut off power supply to a part of the radio frequency circuit. In this solution, not only a main switch but also branch switches are configured, a power cutoff solution can be selected flexibly as required, and even if some electronic switches are faulty, an electronic switch that is not faulty may be used to complete power cutoff, and therefore, the solution provides greater stability.

Optionally, on a basis of all the foregoing embodiments of the wireless terminal, the baseband control circuit is further configured to send a connect command to at least one electronic switch set on a power supply line at the end of a time period during which power supply to all circuits or some circuits of the radio frequency circuit is cut off, to control the at least one electronic switch to connect, when the wireless terminal is in an awake state, the power supply line on which the at least one electronic switch is located.

It should be noted that, in descriptions of the embodiments of FIG. 5C and FIG. 5D, division of the radio frequency circuit is mainly based on functional division. In an actual product, functions of one circuit may be implemented by multiple chips, or multiple circuits may be implemented in one chip, for example, the reception processing circuit and the transmission processing circuit may be combined into one chip.

Optionally, in the foregoing embodiments of FIG. 5A to FIG. 5D, the baseband control circuit is further configured to send a connect command to all electronic switches that have already received the disconnect command at the end of a time period during which power supply to all circuits or some circuits of the radio frequency circuit is cut off. This function is to control the electronic switches that receive the connect command to connect, in all other time periods than the time period during which power supply to all circuits or some circuits of the radio frequency circuit is cut off, power supply lines on which the electronic switches that receive the connect command are located. The electronic switch is further configured to receive the connect command, and connect, according to the connect command, a power supply line on which the electronic switch is located. This solution ensures that, in the wireless terminal, in other time periods than the time period during which power supply to some circuits of the radio frequency circuit in the wireless terminal is stopped, the radio frequency circuit can obtain power supply and work normally. It may be understood that, power supply to the baseband control circuit may be maintained all the time, and the baseband control circuit keeps timing, and sends, at the end of the time period during which power supply to some circuits of the radio frequency circuit in the wireless terminal is stopped, the connect command to the electronic switch that has already received the connect demand, to connect the power supply line that was disconnected before.

Optionally, if in an entire power supply control process, the wireless terminal receives a command, sent by a user, of exiting a power saving mode, or the wireless terminal shuts down, or a quantity of remaining electricity of the wireless terminal is higher than a set threshold, or the wireless terminal enters a particular time period, or the wireless terminal is in a particular location, or the wireless terminal switches from an idle state to a connected state, or in another set condition, the method terminates immediately. The power supply control process is performed only when a command, input by the user, of entering the power saving mode is received again or there is another trigger condition. Further, the processor unit in the wireless terminal may perform monitoring. If detecting that the foregoing termination condition occurs, the processor unit instructs the baseband control circuit in the communications unit to stop the foregoing power supply control process that is currently performed. If the disconnect command has already been sent, but the connect command is not sent yet, the connect command is immediately sent to the switch circuit that receives the disconnect command, and the disconnect command is not sent again before the power supply control procedure is restarted. If the connect command has already been sent after the disconnect command is sent, the disconnect command is not sent again before the power supply control procedure is restarted.

An embodiment of the present disclosure further provides a power supply control method. The method is applicable to a wireless terminal that may enter a dormant state. The method includes stopping supplying power to some or all circuits of a radio frequency circuit in the wireless terminal in a part or all of a time period during which a wireless terminal is in a dormant state, where the dormant state includes at least one of the following: a dormant state in a DTX period and a dormant state in a DRX period. Power is supplied to some or all circuits of the radio frequency circuit in a part or all of a time period of at least one dormant state in DRX or DTX periods, and a power-cutoff time period is more flexible and diverse.

The present disclosure may be executed by the wireless terminal, or may be executed by a baseband control circuit of the wireless terminal.

It may be understood that, a time during which power supply to some or all circuits of the radio frequency circuit is stopped is not greater than a time during which the wireless terminal is in the dormant state.

With reference to the foregoing descriptions, when the wireless terminal is in the dormant state in the DTX period, the wireless terminal does not receive a message sent by a network side device, and some circuits of the wireless terminal are in a low power consumption state at this time. When the wireless terminal is in the dormant state in the DTX period, the wireless terminal does not send a message to the network side device, and some circuits of the wireless terminal are in a low power consumption state at this time.

Execution of the method may be triggered when the wireless terminal receives a command selected by a user, or when the wireless terminal automatically detects that a quantity of remaining electricity is lower than a threshold, or when the wireless terminal detects that the wireless terminal is currently in a set time period or detects that the wireless terminal is in a set location, or the like.

For a meaning of the radio frequency circuit in this embodiment, reference may be made to descriptions of the radio frequency circuit in the foregoing apparatus embodiments.

According to descriptions of this embodiment, the time period during which power supply to all or some circuits of the radio frequency circuit is stopped further includes the following eight time periods.

(a) All of a dormant time period in a DTX period of the wireless terminal;

(b) A part of a dormant time period in a DTX period of the wireless terminal;

(c) All of a dormant time period in a DRX period of the wireless terminal;

(d) A part of a dormant time period in a DRX period of the wireless terminal;

(e) The time periods of (a) and (c);

(f) The time periods of (a) and (d);

(g) The time periods of (b) and (c); and (h) The time periods of (b) and (c).

All of the dormant time period in the DTX period refers to an entire dormant time period in the DTX period, and there is at least one DTX period. The part of the dormant time period in the DTX period refers to a part of the dormant time period in the DTX period, for example, the first one-half of a dormant time period in one DTX period, or the first one-third of dormant time periods in all DTX periods, and there is at least one DTX period.

All of the dormant time period in the DRX period refers to an entire dormant time period in the DRX period, and there is at least one DRX period. The part of the dormant time period in the DRX period refers to a part of the dormant time period in the DRX period, for example, the first one-half of a dormant time period in one DRX period, or the first one-third of dormant time periods in all DTX periods, and there is at least one DRX period.

According to the method of this embodiment of the present disclosure, when the wireless terminal is in the dormant state, it is not necessary to supply power to all of a radio frequency circuit such that electric energy consumption of the wireless terminal is reduced, and a standby time is increased, besides, reliability of the radio frequency circuit gradually decreases in a case in which power is supplied to the radio frequency circuit for a long time, and therefore, a service life of the radio frequency circuit in the wireless terminal is also increased in this embodiment of the present disclosure.

Optionally, in this embodiment of the present disclosure, stopping supplying power to all or some circuits of the radio frequency circuit in the foregoing eight time periods refers to stopping supplying power to all or some circuits of the radio frequency circuit only in the eight time periods. Using (a) as an example, power supply to all or some circuits of the radio frequency circuit is stopped only in all of the dormant time period in the DTX period of the wireless terminal, and in all other time periods than all of the dormant time period in the DTX period, power supply to all circuits of the radio frequency circuit is restored, which is similar to a case of the remaining (b) to (h), and details are not described herein again. Restoring power supply to all circuits of the radio frequency circuit by the wireless terminal may be as follows. At the end of a time period during which power supply to some circuits of the radio frequency circuit in the wireless terminal is stopped, sending, by the baseband control circuit, a connect command to a switch circuit that has already received a disconnect command, to connect a power supply line that has been disconnected before.

If the time period during which power supply to all or some circuits of the radio frequency circuit is stopped is a case of (e) to (h), when the wireless terminal currently performs both DTX and DRX, a special case may exist, that is, the wireless terminal is currently in a DRX dormant time period but not in a DTX dormant time period, or the wireless terminal is currently in a DTX dormant time period but not in a DRX dormant time period. To ensure normal proceeding of DTX or DRX, power supply to related circuits of the radio frequency circuit needs to be maintained, and to simplify a design, it may be designed that power supply to all or some circuits of the radio frequency circuit is stopped only when the wireless terminal is currently both in a DTX dormant time period and in a DRX dormant time period. In other words, "(a) and (c)" in (e) means that both (a) and (c) are satisfied. Meanings of (f) to (h) are similar.

Optionally, the dormant state in the DTX period is dormant states in all DTX periods or dormant states in some DTX periods, and the dormant state in the DRX period is dormant states in all DRX periods or dormant states in some DRX periods.

It means that, to provide further details on a basis of the foregoing time periods (a) to (h) during which power supply is stopped, power supply to some or all circuits of the radio frequency circuit may be stopped in the following eight time periods.

(1) All or a part of a dormant time period in each DTX period of the wireless terminal;

(2) All or a part of a dormant time period in each of some DTX periods of the wireless terminal;

(3) All or a part of a dormant time period in each DRX period of the wireless terminal;

(4) All or a part of a dormant time period in some DRX periods of the wireless terminal;

(5) The time periods of (1) and (3);

(6) The time periods of (2) and (4);

(7) The time periods of (1) and (4); and (8) The time periods of (2) and (3).

There are multiple manners of selecting the some DTX periods in (2) and the some DTX periods in (4), for example, one period is selected from every two consecutive periods, or one or two periods are selected from every three consecutive periods, or first two periods are selected from every four consecutive periods. Suitable "some periods" may be selected during selection based on algorithm complexity, power saving efficiency, and the like, and a selection manner does not constitute a limitation on the present disclosure. It may be understood that, when a total power-cutoff time is longer, a power saving effect is more obvious. When a total time of power saving is relatively short, although a power saving effect is relatively weak, load of a module that is responsible for power supply control and that is of the wireless terminal is relatively small.

In another method embodiment provided in the embodiments of the present disclosure, although the time period is classified into the foregoing eight cases, it may be understood that, each case of (1) to (4) actually includes two cases "all" and "a part", and each case of (5) to (8) actually includes four cases "all+a part", "all+all", "a part+a part", and "a part+all", and division of the foregoing eight cases is only for ease of description.

Optionally, in this embodiment of the present disclosure, stopping supplying power to all or some circuits of the radio frequency circuit in the foregoing eight time periods refers to stopping supplying power to all or some circuits of the radio frequency circuit only in the eight time periods. Using (1) as an example, power supply to all or some circuits of the radio frequency circuit is stopped only in all or a part of the dormant time period in each DTX period of the wireless terminal. Furthermore, if power supply is stopped in all of the dormant time period in each DTX period of the wireless terminal, power supply to all circuits of the radio frequency circuit is restored in all other time periods than all of the dormant time period in each DTX period of the wireless terminal. If power supply is stopped in a part of the dormant time period in each DTX period of the wireless terminal, power supply to all circuits of the radio frequency circuit is restored in all other time periods than the part of the dormant time period in each DTX period of the wireless terminal.

Optionally, cutting off power supply to all circuits or some circuits of the radio frequency circuit in a time period of (1) to (8) may not only be understood as a single power saving solution, for example, stopping power supply to all circuits of the radio frequency circuit in all of a dormant time period of each DRX period, and but also be understood as a combination of multiple power saving solutions, for example, cutting off power supply to all circuits of the radio frequency circuit in all of a dormant time period of each DRX period and cutting off power supply to some circuits in the radio frequency circuit in all of a dormant time period of each DTX period. During specific implementation, a suitable power saving time period (such as the time periods described in (1) to (8)) and a power saving range (all circuits or some circuits of the radio frequency circuit) may be designed as required.

If the time period during which power supply to all or some circuits of the radio frequency circuit is stopped is a case of (5) to (8), when the wireless terminal currently performs both DTX and DRX, a special case may exist, that is, the wireless terminal is currently in a DRX dormant time period but not in a DTX dormant time period, or the wireless terminal is currently in a DTX dormant time period but not in a DRX dormant time period. To ensure normal proceeding of DTX or DRX, power supply to related circuits of the radio frequency circuit needs to be maintained, and to simplify a design, it may be designed that power supply to all or some circuits of the radio frequency circuit is stopped only when the wireless terminal is currently both in a DTX dormant time period and in a DRX dormant time period. In other words, "(1) and (3)" in (5) means that both (1) and (3) are satisfied. Meanings of (6) to (8) are similar.

Furthermore, if power supply to all circuits of the radio frequency circuit is cut off in all of a dormant time period of each DRX period, the wireless terminal (which may be a baseband control circuit) keeps timing. At the beginning of a dormant time period of an $N^{th}$ DRX period, the wireless terminal cuts off power supply to all circuits in the radio frequency circuit (which may be the baseband control circuit sends the disconnect command to the switch circuit, and the switch circuit cuts off power supply to all circuits in the radio frequency circuit). At the end of the dormant time period of the $N^{th}$ DRX period (that is, the beginning of an awake time period of the $N^{th}$ DRX period), the wireless terminal restores power supply to all circuits in the radio frequency circuit (which may be the baseband control circuit sends the connect command to the switch circuit, and the switch circuit turns on power supply of all circuits in the radio frequency circuit). At the end of the awake time period of the $N^{th}$ DRX period (that is, the beginning of a dormant time period of an $(N+1)^{th}$ DRX period), the wireless terminal cuts off power supply to all circuits in the radio frequency circuit again (which may be the baseband control circuit sends the disconnect command to the switch circuit, and the switch circuit cuts off power supply to all circuits in the radio frequency circuit). By analogy, N is a positive integer, and it is assumed that in the $N^{th}$ DRX period, the wireless terminal does not receive a message (such as a paging message) that needs to be processed by the wireless terminal. In this case, after the $N^{th}$ DRX period ends, the process proceeds to the $(N+1)^{th}$ DRX period. If in the $N^{th}$ DRX period, the wireless terminal receives a message (such as a paging message) that needs to be processed by the wireless terminal, the wireless terminal switches from an idle state to a connected state, processes the paging message in a prior-art manner, and continues the foregoing power supply control process when the wireless terminal enters the idle state again and continues to perform DRX according to a DRX period.

In another method embodiment provided in the embodiments of the present disclosure, the radio frequency circuit of the wireless terminal includes a transmission processing circuit, a reception processing circuit and an antenna switch. For descriptions of the three components, reference may be made to the foregoing descriptions of related embodiments of FIG. 5A and FIG. 5B.

The stopping supplying power to some circuits of a radio frequency circuit in the wireless terminal further includes one or two of the following. Disconnecting an electronic switch located on a power supply line of the transmission processing circuit, disconnecting an electronic switch located on a power supply line of the reception processing circuit, and disconnecting an electronic switch located on a power supply line of the antenna switch.

The stopping supplying power to all circuits of a radio frequency circuit in the wireless terminal further includes disconnecting an electronic switch located on a power supply line of the transmission processing circuit, disconnecting an electronic switch located on a power supply line of the transmission processing circuit, and disconnecting an electronic switch located on a power supply line of the antenna switch.

It may be understood that, there is at least one electronic switch, and for a location of the electronic switch, reference may be made to the foregoing specific embodiments of FIG. 5A and FIG. 5B, and details are not described herein again.

It should be noted that, this embodiment provides a power supply solution in which the radio frequency circuit is flexibly controlled, and power supply to a particular part in the radio frequency circuit is cut off as required in the part or all of the time period during which the wireless terminal is in the dormant state.

Restoring power supply to all circuits of the radio frequency circuit may be as follows. At the end of a time period during which power supply to some circuits of the radio frequency circuit in the wireless terminal is stopped, sending, by the baseband control circuit, a connect command to an electronic switch that has already received the disconnect command, to connect the power supply line that has been disconnected before. Therefore, it is ensured that after power cutoff ends, the wireless terminal restores normal power supply and normal working.

In another method embodiment provided in the embodiments of the present disclosure, the radio frequency circuit includes a transmission processing circuit and a reception processing circuit. For descriptions of the three components, reference may be made to the foregoing descriptions of related embodiments of FIG. 5C and FIG. 5D.

The stopping supplying power to some circuits of a radio frequency circuit in the wireless terminal includes disconnecting an electronic switch located on a power supply line of the transmission processing circuit, or disconnecting an electronic switch located on a power supply line of the reception processing circuit.

The stopping supplying power to all circuits of a radio frequency circuit in the wireless terminal further includes disconnecting an electronic switch located on a power supply line of the transmission processing circuit, and disconnecting an electronic switch located on a power supply line of the reception processing circuit.

It may be understood that, there is at least one electronic switch, and for a location of the electronic switch, reference may be made to the foregoing specific embodiments of FIG. 5C and FIG. 5D, and details are not described herein again.

It should be noted that, this embodiment provides a power supply solution in which the radio frequency circuit is flexibly controlled, and power supply to a particular part in the radio frequency circuit is cut off as required in the part or all of the time period during which the wireless terminal is in the dormant state.

Restoring power supply to all circuits of the radio frequency circuit may be as follows. At the end of a time period during which power supply to some circuits of the radio frequency circuit in the wireless terminal is stopped, sending, by the baseband control circuit, a connect command to an electronic switch that has already received the disconnect command, to connect the power supply line that has been disconnected before, therefore, it is ensured that after power cutoff ends, the wireless terminal restores normal power supply and normal working.

Optionally, if in an entire execution process of the method, the wireless terminal receives a command, sent by a user, of exiting a power saving mode, or the wireless terminal shuts down, or a quantity of remaining electricity of the wireless terminal is higher than a threshold, or the wireless terminal enters a particular time period, or the wireless terminal is in a particular location, or the wireless terminal switches from an idle state to a connected state, or another set condition is satisfied, the method terminates immediately. The power supply control method is performed only when a command, input by the user, of entering the power saving mode is received again or there is another trigger condition.

Figure 6:
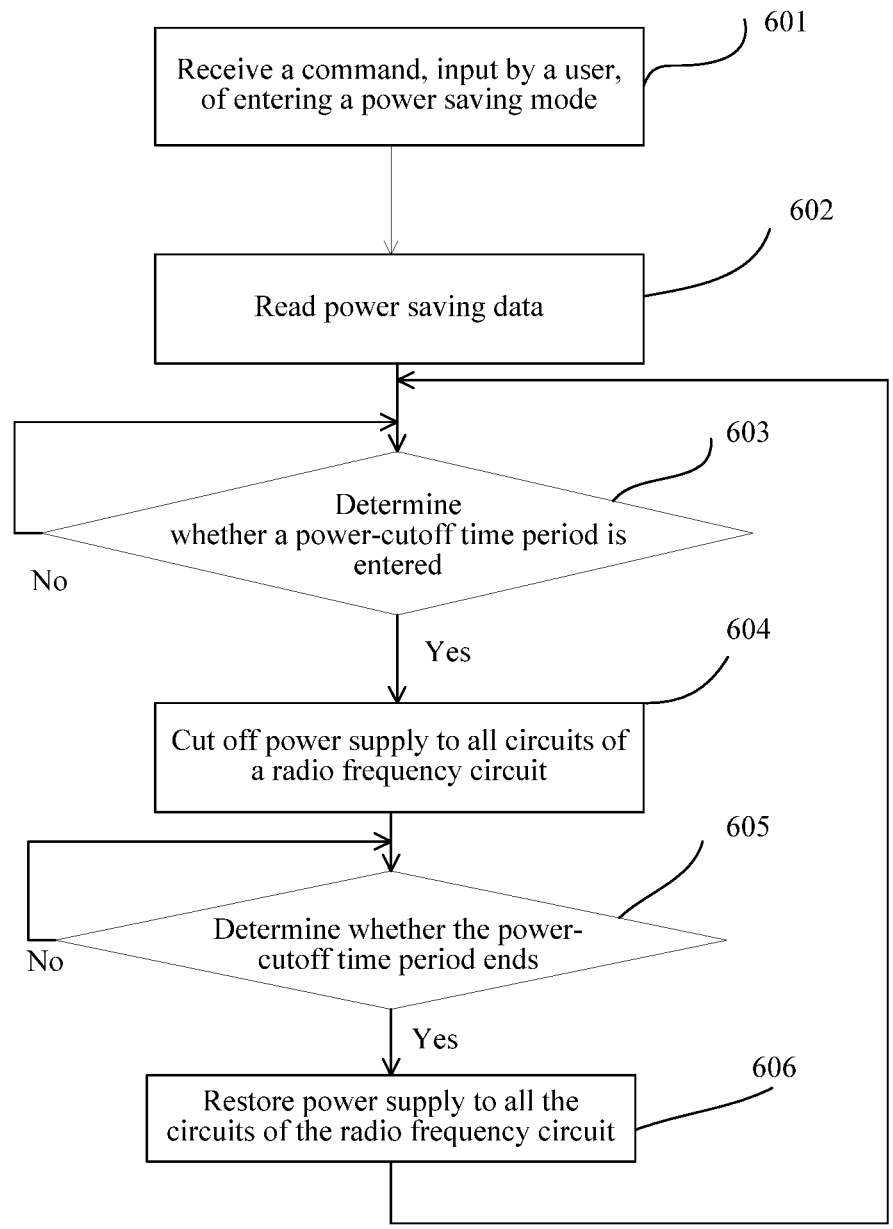
FIG. 6 is a flowchart of a power supply control method according to an embodiment of the present disclosure.

As shown in FIG. 6, FIG. 6 is a flowchart of a power supply control method according to an embodiment of the present disclosure. The method is executed by a wireless terminal. Power supply circuits of circuits of a radio frequency circuit of the wireless terminal may be disconnected or connected using a switch circuit. The method includes the following steps.

Step 601: Receive a command, input by a user, of entering a power saving mode.

When the user inputs the command of entering the power saving mode, execution of the power supply control method is triggered. The power saving mode herein may be integrated with a prior-art power saving mode of the wireless terminal. For example, a sub-option is added on a basis of the prior-art power saving mode, and when the sub-option is selected, the power supply control method is triggered, or the power supply control method is triggered directly when the prior-art power saving mode is selected. The command of entering the power saving mode may be input using an input unit of the wireless terminal. For details, reference may be made to descriptions of the input unit in FIG. 3, and details are not described herein again. As described in the foregoing embodiments, step 601 herein may also be replaced with that the wireless terminal detects that the wireless terminal is currently in a set location or is currently in a set time period, or the wireless terminal automatically executes the method after startup, or the wireless terminal automatically detects that a quantity of remaining electricity is lower than a threshold, and details are not described herein again.

Step 602: Read power saving data.

The power saving data herein includes circuits of the radio frequency circuit that are to be disconnected, and a time period during which power supply to some circuits of the radio frequency circuit in the wireless terminal is stopped, and the like. Power supply to the radio frequency circuit in the wireless terminal is subsequently controlled according to the power saving data. In this embodiment, a power cutoff range is all circuits of the radio frequency circuit, and optionally, may also be some circuits of the radio frequency circuit. For details, reference may be made to descriptions of the foregoing embodiments.

Step 603: Determine whether a power-cutoff time period is entered, and if it is entered, continue to perform step 604, or if not, continue to perform step 603.

Herein, a baseband control circuit may perform timing. If the power-cutoff time period (the time period during which power supply to some circuits of the radio frequency circuit in the wireless terminal is stopped, for example, dormant time periods in all DRX periods) is entered, step 604 is triggered subsequently, and if the power-cutoff time period is not reached, timing is continued.

Step 604: Cut off power supply to all circuits of the radio frequency circuit.

Herein, the baseband control circuit may send a disconnect command to the switch circuit, to cut off power supply to all circuits of the radio frequency circuit.

Step 605: Determine whether the power-cutoff time period ends, if the power-cutoff time period ends, continue to perform step 606, and if not, continue to perform step 605.

Herein, the baseband control circuit may keep timing. If the power-cutoff time period ends, the process proceeds to 606, or if the power-cutoff time period does not end yet, the baseband control circuit continues timing.

Step 606: Restore power supply to all of the radio frequency circuit, and continue to perform step 603.

Herein, the baseband control circuit may send a connect command to the switch circuit, to restore power supply to all circuits of the radio frequency circuit.

Optionally, after power supply is restored, the baseband control circuit may keep timing, and determine whether a power saving time period is entered again. This case is applicable only when the power-cutoff time period includes multiple discontinuous time periods instead of one continuous time period. If in the entire process, the wireless terminal switches from an idle state to a connected state, the wireless terminal processes a related message in a connected state in the prior art, and continues to execute the power supply control method when the wireless terminal enters the idle state again or another trigger condition is satisfied.

For details, reference may be made to descriptions of the foregoing embodiments, for example, the power-cutoff time period is all of a dormant time period in each DRX period, and in this case, power cutoff needs to be performed once in each DRX period.

Optionally, if in an entire execution process of the method, the wireless terminal receives a command, sent by a user, of exiting a power saving mode, or the wireless terminal shuts down, or a quantity of remaining electricity of the wireless terminal is higher than a threshold, or the wireless terminal enters a particular time period, or the wireless terminal is in a particular location, or the wireless terminal switches from an idle state to a connected state, or another set condition is satisfied, the method terminates immediately. The steps after step 601 are performed again when the command, input by the user, of entering the power saving mode is received again, or the steps after step 601 are performed automatically after the wireless terminal restarts.

The method provided in this embodiment provides a specific power supply control solution. Power supply to all of a radio frequency circuit can be cut off according to a power-cutoff time period such that electric energy consumption can be obviously reduced, a standby time and a service life of the radio frequency circuit are increased.

Figure 7:
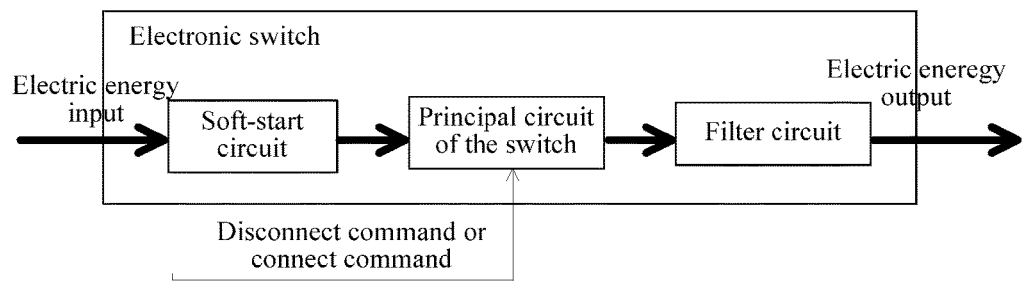
FIG. 7 is a schematic structural diagram of an electronic switch according to an embodiment of the present disclosure.

It should be noted that, an electronic switch in the prior art may be selected as the electronic switch mentioned in the embodiments of the present disclosure. Particularly, an electronic switch whose response time is relatively short needs to be selected, to improve power supply control precision. In addition, to ensure that power supply to a next-level device at a moment at which the electronic switch is connected does not exceed a rated input voltage of the device, setting a capacitor that absorbs high instantaneous voltage before power source output in the electronic switch may be considered. As shown in FIG. 7, FIG. 7 is a schematic structural diagram of an electronic switch used in an embodiment of the present disclosure. The electronic switch includes a soft-start circuit, a principal circuit of the switch, and a filter circuit, and the three circuits are electrically connected in sequence. A thicker arrow represents an electric-energy transmission relationship, and a thinner arrow represents a signal transmission relationship. The soft-start circuit is electrically connected to a power source processing circuit, the filter circuit is electrically connected to a radio frequency circuit, and a connect command or disconnect command sent by a baseband control circuit is sent to the principal circuit of the switch for execution. The soft-start circuit is configured to implement soft startup of current, the principal circuit of the switch is configured to implement electric connection according to the connect command and implement electric disconnection according to the disconnect command, and the filter circuit is configured to filter out noise that is generated at a moment at which the principal circuit of the switch is opened and at a moment at which the principal circuit of the switch is closed. The foregoing three circuits may be implemented in various manners in the prior art, which are not limited herein.

The foregoing describes specific embodiments of the present disclosure, and the methods of the present disclosure may be improved appropriately in a specific implementation process, to meet specific requirements of specific situations. Therefore, it is understandable that, the specific implementation manners of the present disclosure only play an exemplary role, and are not used to limit the protection scope of the present disclosure.

What is claimed is:

1. A power supply control method, comprising:
   simultaneously performing discontinuous transmission (DTX) and discontinuous reception (DRX) by a wireless terminal, the DTX comprising a DTX dormant time period and a DTX awake time period, and the DRX comprising a DRX dormant time period and a DRX awake time period;
   stop supplying power to at least some circuits of a radio frequency circuit in the wireless terminal in only a part of a time period during which the wireless terminal is in a dormant state, the dormant state comprising the wireless terminal being in both the DTX dormant time period and the DRX dormant time period, the DTX dormant time period comprising an entire DTX period, and the DRX dormant time period comprising a fraction of a DRX period; and
   resume supplying power to the at least some circuits of the radio frequency circuit in the wireless terminal when the wireless terminal is in the DTX awake time period or the DRX awake time period.

2. The method of claim 1, wherein the radio frequency circuit comprises a transmission processing circuit, a reception processing circuit, and an antenna switch, and stop supplying power to the at least some circuits of the radio frequency circuit in the wireless terminal comprises at least one of the following:
   disconnecting an electronic switch located on a power supply line of the transmission processing circuit;
   disconnecting an electronic switch located on a power supply line of the reception processing circuit; or
   disconnecting an electronic switch located on a power supply line of the antenna switch.

3. The method of claim 1, wherein the radio frequency circuit comprises a transmission processing circuit and a reception processing circuit, and stop supplying power to the at least some circuits of the radio frequency circuit in the wireless terminal comprises:
   disconnecting the electronic switch located on the power supply line of the transmission processing circuit; and
   disconnecting an electronic switch located on a power supply line of the reception processing circuit.

4. The method of claim 1, wherein stop supplying power to the at least some circuits of the radio frequency circuit in the wireless terminal comprises stop supplying power for multiple discontinuous time periods.

5. The method of claim 1, wherein the radio frequency circuit comprises a transmission processing circuit and a reception processing circuit, stop supplying power to at least some circuits of the radio frequency circuit in the wireless terminal comprises disconnecting an electronic switch located on a power supply line of the reception processing circuit, and stop supplying power to at least some circuits of the radio frequency circuit in the wireless terminal comprises:
   disconnecting an electronic switch located on a power supply line of the transmission processing circuit; and
   disconnecting an electronic switch located on a power supply line of the reception processing circuit.

6. The method of claim 1, further comprising supplying power to all circuits of the radio frequency circuit in all other time periods than the time period during which power supply to the at least some circuits of the radio frequency circuit is cut off.

7. A power supply control method, comprising:
   simultaneously performing discontinuous transmission (DTX) and discontinuous reception (DRX) by a wireless terminal, the DTX comprising a DTX dormant time period and a DTX awake time period, and the DRX comprising a DRX dormant time period and a DRX awake time period;
   stop supplying power to at least some circuits of a radio frequency circuit in the wireless terminal in only a part of a time period during which the wireless terminal is in a dormant state, the dormant state comprising the wireless terminal being in both the DTX dormant time period and the DRX dormant time period, the DTX dormant time period comprising a fraction of a DTX period, and the DRX dormant time period comprising an entire DRX period; and
   resume supplying power to the at least some circuits of the radio frequency circuit in the wireless terminal when the wireless terminal is in the DTX awake time period or the DRX awake time period.

8. The method of claim 7, wherein the radio frequency circuit comprises a transmission processing circuit, a reception processing circuit, and an antenna switch, and stop supplying power to the at least some circuits of the radio frequency circuit in the wireless terminal comprises at least one of the following:
   disconnecting an electronic switch located on a power supply line of the transmission processing circuit;
   disconnecting an electronic switch located on a power supply line of the reception processing circuit; or
   disconnecting an electronic switch located on a power supply line of the antenna switch.

9. The method of claim 7, wherein the radio frequency circuit comprises a transmission processing circuit and a reception processing circuit, and stop supplying power to the at least some circuits of the radio frequency circuit in the wireless terminal comprises:
   disconnecting the electronic switch located on the power supply line of the transmission processing circuit; and
   disconnecting an electronic switch located on a power supply line of the reception processing circuit.

10. The method of claim 7, wherein stop supplying power to the at least some circuits of the radio frequency circuit in the wireless terminal comprises stop supplying power for multiple discontinuous time periods.

11. The method of claim 7, wherein the radio frequency circuit comprises a transmission processing circuit and a reception processing circuit, stop supplying power to at least some circuits of the radio frequency circuit in the wireless terminal comprises disconnecting an electronic switch located on a power supply line of the reception processing circuit, and stop supplying power to at least some circuits of the radio frequency circuit in the wireless terminal comprises:
   disconnecting an electronic switch located on a power supply line of the transmission processing circuit; and
   disconnecting an electronic switch located on a power supply line of the reception processing circuit.

12. The method of claim 7, further comprising supplying power to all circuits of the radio frequency circuit in all other time periods than the time period during which power supply to the at least some circuits of the radio frequency circuit is cut off.

13. A power supply control method, comprising:
simultaneously performing discontinuous transmission (DTX) and discontinuous reception (DRX) by a wireless terminal, the DTX comprising a DTX dormant time period and a DTX awake time period, and the DRX comprising a DRX dormant time period and a DRX awake time period;
stop supplying power to at least some circuits of a radio frequency circuit in the wireless terminal in only a part of a time period during which the wireless terminal is in a dormant state, the dormant state comprising the wireless terminal being in both the DTX dormant time period and the DRX dormant time period, the DTX dormant time period comprising a fraction of a DTX period, and the DRX dormant time period comprises a fraction of a DRX period; and
resume supplying power to the at least some circuits of the radio frequency circuit in the wireless terminal when the wireless terminal is in the DTX awake time period or the DRX awake time period.

14. The method of claim 13, wherein the radio frequency circuit comprises a transmission processing circuit, a reception processing circuit, and an antenna switch, and stop supplying power to the at least some circuits of the radio frequency circuit in the wireless terminal comprises at least one of the following:
disconnecting an electronic switch located on a power supply line of the transmission processing circuit;
disconnecting an electronic switch located on a power supply line of the reception processing circuit; or
disconnecting an electronic switch located on a power supply line of the antenna switch.

15. The method of claim 13, wherein the radio frequency circuit comprises a transmission processing circuit and a reception processing circuit, and stop supplying power to the at least some circuits of the radio frequency circuit in the wireless terminal comprises:
disconnecting the electronic switch located on the power supply line of the transmission processing circuit; and
disconnecting an electronic switch located on a power supply line of the reception processing circuit.

16. The method of claim 13, wherein stop supplying power to the at least some circuits of the radio frequency circuit in the wireless terminal comprises stop supplying power for multiple discontinuous time periods.

17. The method of claim 13, wherein the radio frequency circuit comprises a transmission processing circuit and a reception processing circuit, stop supplying power to at least some circuits of the radio frequency circuit in the wireless terminal comprises disconnecting an electronic switch located on a power supply line of the reception processing circuit, and stop supplying power to at least some circuits of the radio frequency circuit in the wireless terminal comprises:
disconnecting an electronic switch located on a power supply line of the transmission processing circuit; and
disconnecting an electronic switch located on a power supply line of the reception processing circuit.

18. The method of claim 13, further comprising supplying power to all circuits of the radio frequency circuit in all other time periods than the time period during which power supply to the at least some circuits of the radio frequency circuit is cut off.

* * * * *